Feb. 9, 1971 — D. A. HENNING — 3,562,693
PRECISION POTENTIOMETER
Filed Jan. 24, 1969 — 2 Sheets-Sheet 2
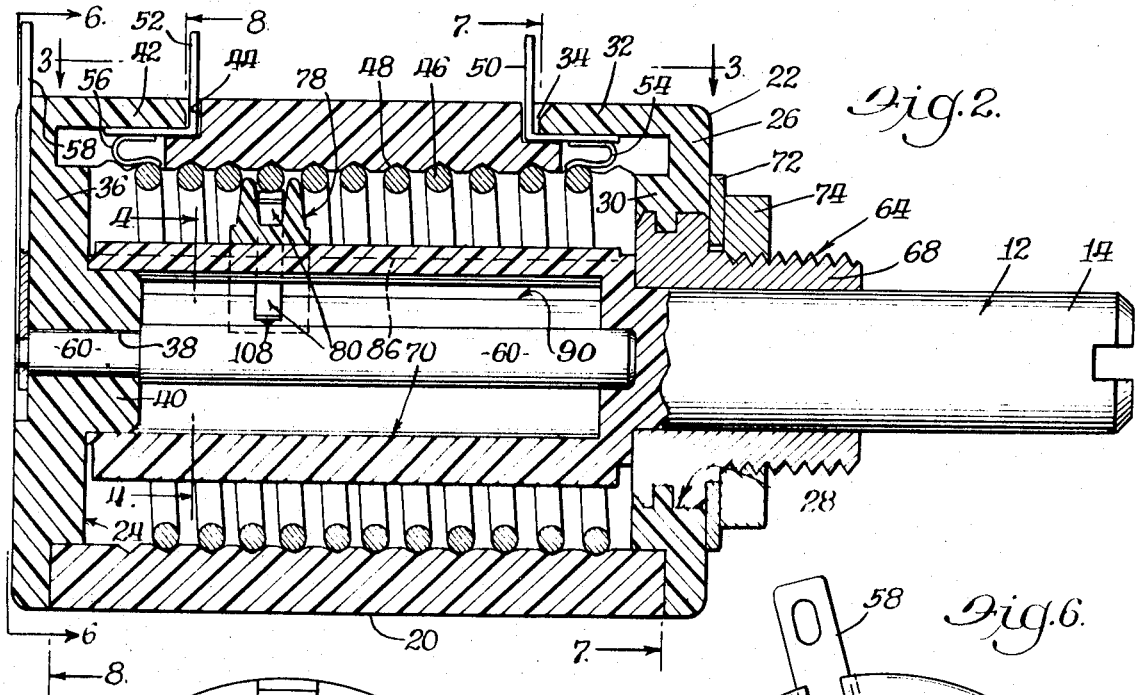
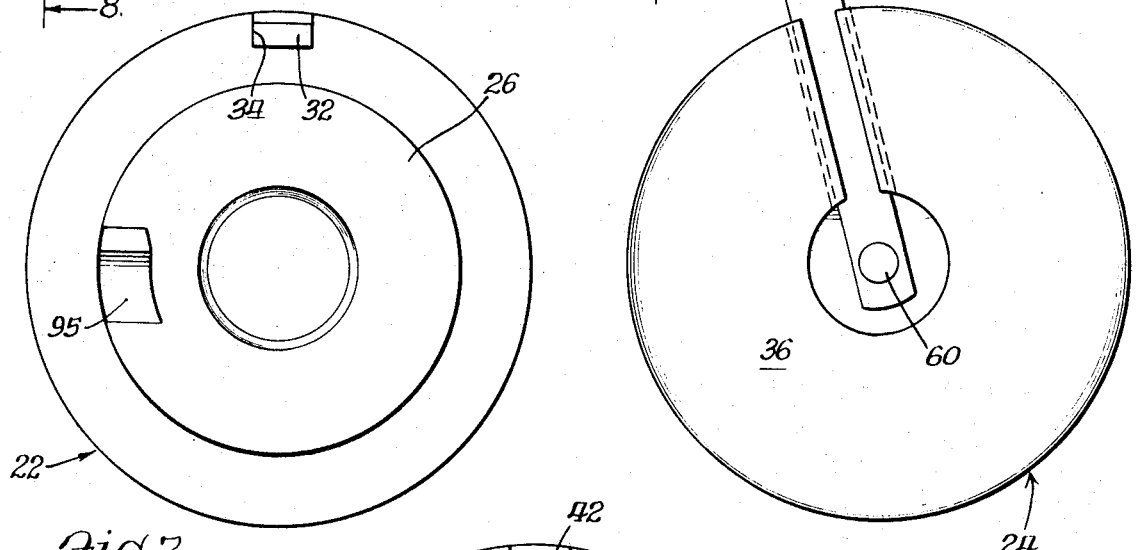
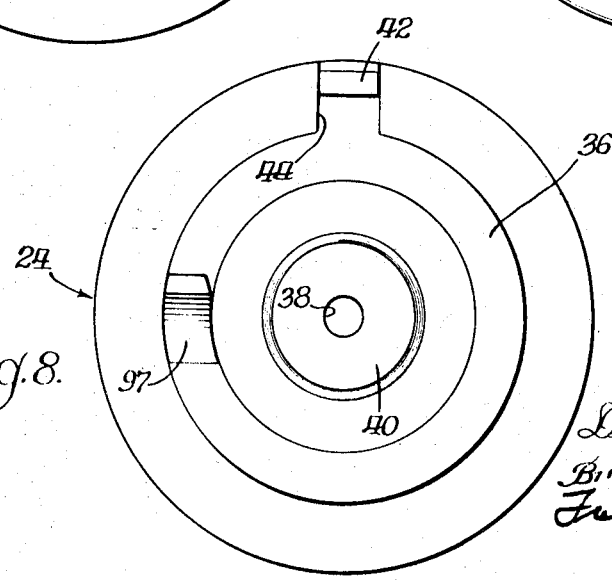
Inventor
Dale Allen Henning

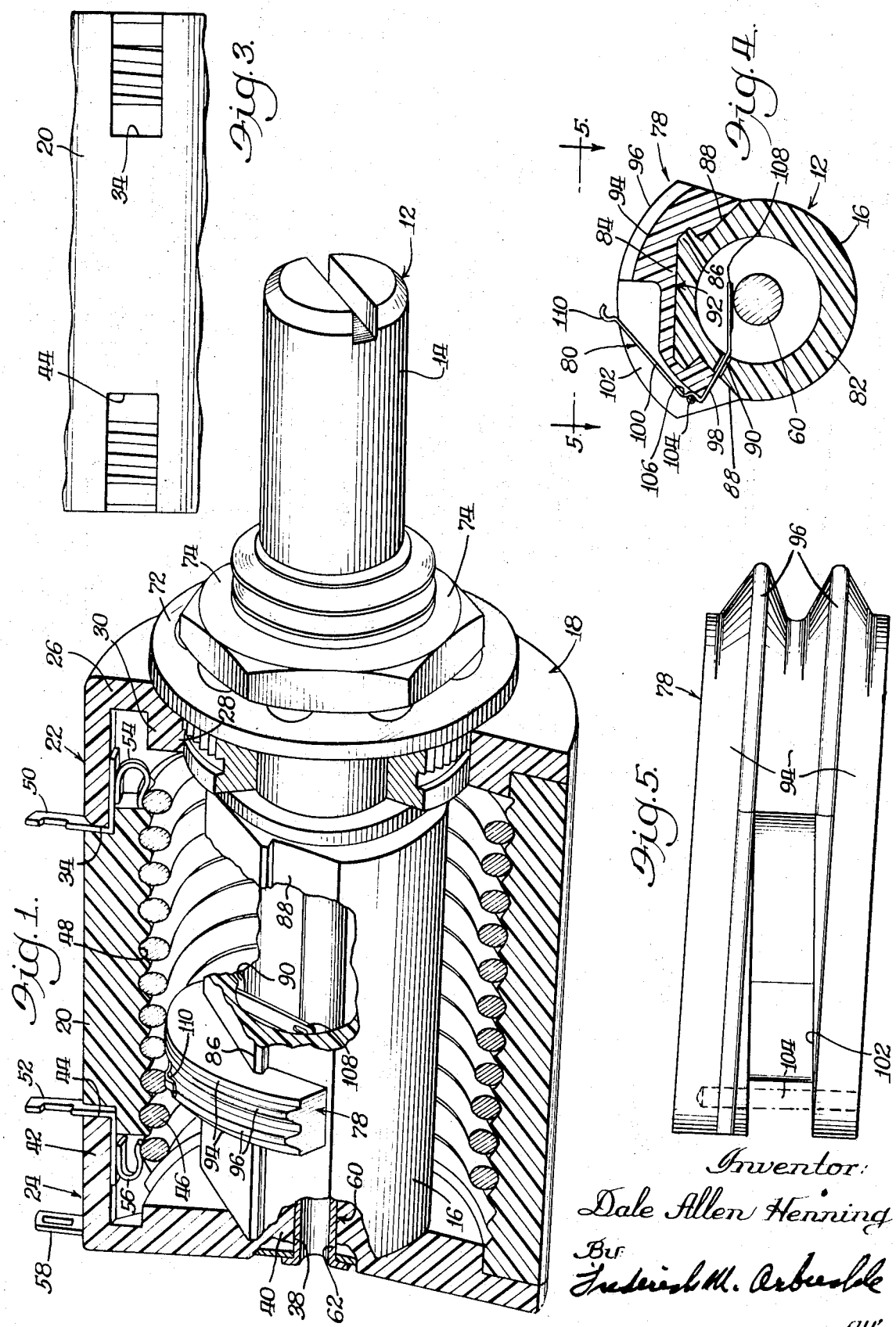

United States Patent Office 3,562,693
Patented Feb. 9, 1971

3,562,693
PRECISION POTENTIOMETER
Dale Allen Henning, Janesville, Wis., assignor to The Bunker-Ramo Corporation, Oak Brook, Ill., a corporation of Delaware
Filed Jan. 24, 1969, Ser. No. 793,785
Int. Cl. H01c 5/02
U.S. Cl. 338—149       8 Claims

ABSTRACT OF THE DISCLOSURE

A precision potentiometer, including a housing with a coil resistance element therein,, a unitary plastic rotor member having a shaft element and a hollow rotor element, a carrier axially slidable on the rotor element, an output contact bar within the hollow rotor element, a slider contact on the carrier slidingly engaging the resistance element and extending through a slot in the rotor element and slidingly engaging the output contact bar.

OBJECTS OF THE INVENTION

A broad object of the invention is to provide a precision potentiometer of novel construction heretofore unknown in the field.

Another object is to provide a potentiometer of high precision in its function and operation but which is much less complex than precision potentiometers heretofore known.

Another and broad object is to provide a precision potentiometer which is much less costly than precision potentiometers heretofore known both in the cost of the parts and in the cost of assembling the parts.

A more specific object is to provide, in the precision potentiometer of the character above referred to, a single integral member which includes a shaft element and a rotor element which effectively replaces a member heretofore used which was commonly made up of four, or five, parts.

A further object is to provide a potentiometer of the foregoing character including a helical resistance element, including novel features in size, positioning and connecting the resistance element, facilitating the construction of the device and rendering it inexpensive.

A further object is to provide a potentiometer of the character referred to incorporating a novel rotor member, and including novel construction providing unusual and effective insulation characteristics.

Another object is to provide in a potentiometer of the foregoing character, a novel rotor member which because of the absence of metal therein eliminates undesirable capacitance that may otherwise occur.

A still further object is to provide a potentiometer having a novel rotor member, and including novel construction whereby to render the rotor member and the housing in which it is mounted of simple nature, and stably mounting the rotor member in place.

Still another object is to provide a device of the character just referred to in which the single integral member is a plastic molding and hence inexpensive.

A still further object of the invention is to provide a precision potentiometer of the character referred to above, having a single integral main rotor member and a central output contact bar, and including a novel arrangement for mounting the output contact bar in the rotor member.

Still another object is to provide in a potentiometer which includes a coil element and a rotor, a novel slider contact bar for engaging the coil, and novel means for mounting it on the rotor.

DESCRIPTION OF A PREFERRED EMBODIMENT

In the drawings:

FIG. 1 is a cutaway perspective view of a precision potentiometer embodying the features of the present invention;

FIG. 2 is an axial sectional view of the potentiometer;

FIG. 3 is a fragmentary view of the exterior of the body element of the potentiometer taken at line 3—3 of FIG. 2;

FIG. 4 is a sectional view taken at line 4—4 of FIG. 2;

FIG. 5 is a view of the carrier taken at line 5—5 of FIG. 4;

FIG. 6 is a view taken at line 6—6 of FIG. 2;

FIG. 7 is a face view of the inner side of the front cover of the housing, oriented according to line 7—7 of FIG. 2; and FIG. 8 is a face view of the inner side of the rear cover of the housing, oriented according to line 8—8 of FIG. 2.

Referring now in detail to the accompanying drawings, attention is directed first to FIGS. 1 and 2 showing the precision potentiometer in its entirety. The precision potentiometer includes a rotor member 12 which with its directly related elements constitutes a principal feature of the invention. This member 12 is preferably a single integral member, of a suitable thermoplastic material and includes a shaft element 14 and a rotor element 16. The details of the shape and conformation of this member and insulation function will be referred to hereinbelow. It is within the scope of the invention to make the rotor element of metal and the shaft element of insulation material such as plastic, if desired, this also being referred to again hereinbelow.

This rotor member 12 is mounted in a housing 18 which also may be formed of a suitable plastic, such as a thermosetting plastic. The housing includes a body 20, a front cover 22 and a rear cover 24. The body 20 is generally cylindrical while the cover plates are generally of flat construction, the front cover including for example a transverse plate element 26 bounded by an inturned flange 30. The front cover also includes an axially extending tongue 32 fitted in a notch 34 in the body. Similarly the rear cover 24 includes a generally transverse plate element 36 having a central opening or aperture 38 surrounding which is an inwardly directed relatively large diameter boss 40. In this case also the rear cover is provided with an axially extending tongue 42 fitted in a notch 44 in the body.

A helical coil, or resistance element 46, is mounted on the interior surface of the housing, such as in a correspondingly helical groove 48 therein. "Resistance element" and "current impeding element" may be considered generic terms to include also an inductance element, an impedance element, and a reactance element. The resistance element is provided with external terminal contact elements 50, 52, fitted in the notches 34, 44, and secured in place by the corresponding tongues 32, 42, these terminal elements being connected with the resistance element through suitable terminal connectors 54, 56. The end portions of the resistance element 46 extend into the notches 34, 44, this facilitating securing the terminal connectors 54, 56, thereto, which may be done by the simple maneuver of inserting those elements and spot welding them to the ends of the resistance element, the contact elements 50, 52, being easily located to the notches and fitted therein.

The device also includes an external terminal contact element 58 secured in place in a suitable manner such as by imbedding it in the rear cover 24 in the molding thereof, represented in FIGS. 2, 3 and 6 and has electrical contact engagement with a central contact bar 60 which may be a round rod, having a hollow rear end 62 fitted in an aperture in the contact element 58 and peened thereover. The contact bar 60 is fitted in the central aperture 38 in the rear cover, and extends forwardly, as referred to again hereinbelow. The rotor member 12 is mounted in the housing with the rotor element 16 enclosed in the housing and the shaft element 14 extending through the central opening 28 in the front cover to the exterior. The member is mounted by means of a bushing 64 having a main enlarged portion carried in the front cover, preferably imbedded therein in the molding of the latter, and having an outwardly forwardly extending threaded portion 68. The rotor element is provided with a bore 70 fitted on the boss 40 and the central contact bar 60 is fitted in a small bore 76 at the inner end of the main bore 70.

The boss 40 is of relatively large diameter, as noted, and is in the neighborhood of the diameter of the shaft element 14. This mounting means for the inner end of the rotor member provides unusually stable support for the rotor member, the large diameter of both the shaft elements and the boss providing such stability, this diameter being nearly that of the rotor element itself. Additionally this mounting structure is very inexpensive.

Mounted on the rotor element 16 is a carrier 78, this being put in position thereon before final assembly of the subassemblies referred to above, and carried by the carrier is a slider contact bar 80 also known as a commutator bar. The rotor element 16 has a main portion 82 which is cylindrical, and an interlocking conformation including a flat 84 of substantial transverse dimension with side ribs, or beads, or shoulders, 86 merging into tapered flat surfaces 88, forming cutouts under the ribs. In one of the tapered surfaces 88 is a slot 90 extending from the open end substantially throughout its length at least to the inner end of the bore 70 therein.

The carrier 78 is of minor dimension axially, and less than 180° circumferentially, with a cylindrical outer surface substantially less than a complete circle, such for example as on the order of 50–60 degrees, as shown in FIG. 4. This carrier has an internal axial groove 92 complementary to the interlocking conformation of the rotor element, namely the flat 84 and ribs 86, and is fitted on the latter and slidable axially therealong. The outer cylindrical surface of the carrier provided with helical grooves 94 formed by correspondingly shaped threads or beads 96. Preferably the beads are two in number and they form a central groove and two outer groove elements, each of the latter for example being about half the axial dimension of the central groove. The groove and groove elements receive turns of the resistance elements and upon rotation of the rotor member this engagement feeds the carrier along the rotor element. The front and rear covers 22, 24 are provided with projections 95, 97 engageable by the end surfaces of the carrier and thus furnishing positive stop for the carrier.

The slider bar 80 may be shaped similar to a hairpin as shown in FIG. 4 and includes an inner leg 98 extending through the slot 90 and an outer leg 100 positioned in a deep groove 102 in the outer surface of the carrier. For assisting in mounting the slider bar, a pin 104 may be secured in the groove 102 engaging a notch or depression 106 in the slider bar. The slider bar is positioned so that its inner leg slidingly engages the central contact bar 60 and for that purpose may be provided with an element 108, arcuate in cross section, directly engaging the central contact bar. Similarly the outer leg 100 of the slider bar may have a contact element 110 arcuate in longitudinal direction positioned generally between the beads 96 on the carrier and thus directly engaging one of the turns of the resistance element 46, the transverse, or axial, extent of the arcuate element being substantial so as to assure constant engagement with the respective turn of the resistance element.

The slider contact bar 80 is confined in the slot 102 against displacement axially. This slot is similar in axial dimension to the central groove 94 which in turn is similar to the axial dimension of one of the turns of the resistance element. Accordingly the slider contact bar can be of minimum axial dimension and it is still retained in effective contact engagement with the corresponding turn or portion of the resistance element. This arrangement minimizes the necessary overall length of the interior of the housing in axial direction, as well as simplifying the construction of the slider contact bar and the carrier.

As noted above the rotor member 12 is a main feature of the invention. Its single integral construction, in its preferred form, and its being made of plastic material, also in its preferred form, provide insulation between a manipulating tool such as a screwdriver applied to the shaft element, and the interior elements of the device. The insulation characteristics of the shaft element would be present even if the rotor element should be made of non-insulation, e.g. metal, from the standpoint of the feature just referred to and it is pointed out that the broad invention comprises such arrangement. However, the single integral construction has an additional advantage in that it eliminates any undesirable capacitance in relation to the resistance element 46, and of course there is the further advantage of economy in materials, manufacture of the parts, and assembly. To these advantages is of course to be added the advantage in simplicity in mounting on the boss 40 as referred to above. A further advantage is the secure and stable positioning of the central contact bar 60 both at its base in the aperture 38 and at its extended end which is securely mounted in the small bore 76 in the shaft element.

The carrier 78 is also a single integral element, such as a plastic molding and is therefore of simple and inexpensive construction. The slider contact bar 80 is carried with the carrier and in being so carried, one end constantly engages the resistance element and the other end constantly engages the central contact bar 60. The inner leg of the slider bar, extending through the slot 90, easily remains in position in contact with the central contact bar in all positions of the carrier, and of the rotor element.

The single integral member 12 is inexpensive both in material and in its fabrication, but particularly in the latter. The molding of the member is extremely inexpensive, and this member replaces, in potentiometers of this general kind heretofore known, a rotor member that has usually been made up of at least four, and sometimes five different elements. The member 12 need not be of extreme precision in its dimensions, because of the simplicity of its mounting, but it is of precision functioning and operation, at least as accurately as precision potentiometers heretofore known which have been of extremely complex structure and of correspondingly great cost. The precision potentiometer made according to the present invention is at least equal to or better than, more complex potentiometers made heretofore according to what are known as "military" specifications. The construction is adapted to small size devices, a representative size being for example about two inches in total length including the housing and the extended end of the shaft element, and for example ⅞ inch in outer diameter of the housing.

What is claimed is:

1. A potentiometer comprising, a housing including a central cylindrical body and a front cover and a rear cover mounted thereon, the covers having tongues extending axially into grooves in the body, a helical resistance element mounted on the inner surface of the body, contact terminals connected with the ends of the resistance element and extending exteriorily of the housing through said notches and the tongues on the covers operating to secure the contacts in position, a rotor member mounted in the housing having a rotor element within the housing and a shaft element extending axially through the front cover, a bushing embedded in the front cover and receiving the shaft element, the rotor element being of greater diameter than the shaft element and engaging said bushing, an output contact bar having a rear end mounted in said rear cover, and extending forwardly therefrom to a position adjacent the front cover, an external contact element secured to the rear of the output contact bar and embedded in the outer surface of the rear cover and extending radially therebeyond, the rotor element having a large central bore extending from the rear end to a position adjacent the forward end thereof and having a reduced bore at the forward end of the large bore, the output contact bar extending into the large bore and fitted in the reduced bore, the rear cover having a central boss received in and journalling the rear end of the rotor element, the rotor element having a non-cylindrical conformation including a flat surface and axially extending ribs at the sides thereof, a carrier mounted on the rotor element having a groove complementary to and receiving said non-cylindrical conformation, said carrier being thus fixed for rotation with the rotor element but slidable axially thereon, the carrier extending less than 180°, the rotor element having a slot extending axially substantially the full length of the large bore, the carrier having helical grooves on its outer surface complementary to and receiving the turns of the helical resistance element, and a slider contact bar generally of hairpin shape having a juncture element and a pair of legs extending therefrom, the carrier having a groove receiving said juncture element and means for mounting the slider bar in the carrier, one of the legs extending through said slot and constantly engaging the output contact bar and the other leg extending from the groove in the carrier and in constant engagement with a turn of the helical resistance element, the slider contact bar being thus mounted on and carried by the carrier and moved in rotational direction pursuant to rotation of the rotor member, and the carrier by virture of its engagement with the helical resistance element moving axially along the rotor element upon rotation of the rotor member.

2. A potentiometer comprising, a housing having a cylindrical body and end members, the body having axially extending notches in its ends, the end members having tongues extending into the notches, a coil element on the inner surface on the body and having portions extending axially outwardly into the projection of the notches, contact elements secured to the outer ends of the coil and extending radially through the notches, and confined between the tongues and the walls of the notches, a rotor member including a rotor element in the housing and a shaft extending to the exterior, a slider contact bar mounted on the rotor and engaging the coil, and an output contact bar engaged by the slider contact bar and extending to the exterior.

3. A potentiometer comprising, a housing having a coil resistance element on its inner surface, a rotor member having a rotor element in the housing and a shaft extending to the exterior, a carrier on the rotor element and slidable axially therealong, the carrier having engagement with the coil and operative thereby for moving axially in response to rotation of rotor member, the carrier having a radial groove therein similar in axial extent to a turn of the resistance element, a slider contact bar in said groove and carried by the carrier and confined axially by said groove whereby it has an axial dimension similar to a turn of the coil, and retained in constant engagement with the coil in all axial movements of the carrier.

4. A potentiometer comprising, a housing including a cylindrical body and a rear cover and a front cover, the rear cover having an axial aperture and an inwardly extending, relatively large diameter boss surrounding the aperture, the front cover having a central aperture, a coil resistance element on the inner surface of the cylindrical body, a single integral rotor member of insulating material having a hollow, relatively large diameter rotor element in the housing with an open rear end journalled on said boss and a shaft extending through the aperture in the front cover, an axial output contact bar in the hollow rotor element with its front end having bearing support in an interior recess in the front end of the hollow portion thereof, and its rear end extending through the axial aperture of the rear cover for connection with an external conductor, a carrier mounted on the rotor element for rotation therewith and for sliding movement thereon, a slider contact bar mounted on the carrier and movable axially therewith and including inner and outer legs extending transverse to the axis of the rotor member, the inner leg extending through an axial slot in the rotor element and constantly engaging the output contact bar and the outer leg constantly engaging the resistance element.

5. A potentiometer according to claim 4 wherein the carrier is provided with a notch transverse to the axis of the rotor element and the slider contact bar is mounted in the notch and has a substantial portion thereof disposed within the notch, whereby the slider contact bar is confined by the notch against displacement axially of the carrier.

6. A potentiometer according to claim 5 wherein the carrier has axially spaced elements extending radially outwardly to at least adjacent the resistance element and disposed effectively on opposite sides of the corresponding turn of the coil of the resistance element, and the extended end of the outer leg of the slider contact bar is disposed between those axially spaced elements and thereby confined against axial displacement and held effectively in contact with said corresponding turn of the coil.

7. A potentiometer according to claim 5 wherein the rotor element and the carrier have interlocking tongue-and-groove connection substantially without play in circumferential direction, the carrier is of angular extent substantially less than 180° and its outer surface is generally circular, said notch opens circumferentially through one end of the carrier, and the slide contact bar is generally hairpin shape with a central loop portion adjacent the open end of said notch.

8. A potentiometer according to claim 4 wherein the shaft on the rotor member is similar in diameter to the boss on the rear cover, the rotor element forms an annular shoulder surrounding the shaft engaging the front cover and the rear open end of the rotor element engages the rear cover, and the engagement with the covers confines the rotor member against axial displacement.

References Cited

UNITED STATES PATENTS

| | | | |
|---|---|---|---|
| 2,900,614 | 8/1959 | Gach et al. | 338—149 |
| 3,139,601 | 6/1964 | Kruse et al. | 338—143 |
| 3,314,036 | 4/1967 | Kruse | 338—143 |

LARAMIE E. ASKIN, Primary Examiner

D. A. TONE, Assistant Examiner